Oct. 17, 1967  L. MÜLLER  3,347,384
FILTER PRESS
Filed Nov. 28, 1966
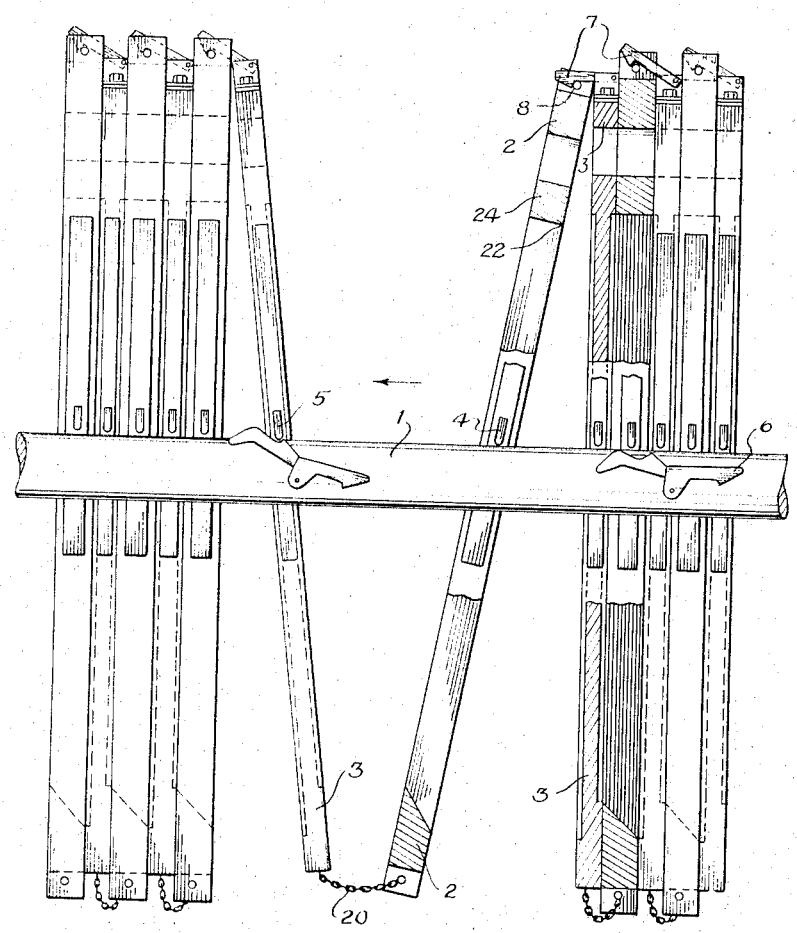

3,347,384
FILTER PRESS
Lothar Müller, Gartenstrasse 10, Wesseling,
Bezirk Cologne, Germany
Filed Nov. 28, 1966, Ser. No. 597,424
Claims priority, application Germany, Dec. 4, 1965,
D 48,826
2 Claims. (Cl. 210—225)

ABSTRACT OF THE DISCLOSURE

In a plate-frame filter press in which spaced pairs of plates and frames are supported by rods extending along the sides of the plates and frames and in which the upper ends of the plates and frames are coupled, the tilting of the frame is increased by joining the bottom of each frame to the bottom of a preceding plate with a flexible member.

---

This invention is an improvement upon the invention disclosed in my copending application Serial No. 435,465, filed Feb. 26, 1965, for "Filter Press."

In said copending application, a filter press is disclosed which is composed of a plurality of filter plates alternated with filter frames which are automatically advanced along supporting rails in order to separate the filter cake collected in the frames. To enable the quick removal of the cake from the frames, the top of each frame is latched to the top of its respective following plate so that when a frame is moved it is tilted so the cake can fall out from the frame and when the tilting has reached a certain angle, the latch is disengaged so that the frame can be moved forward by itself.

This construction operates satisfactorily with cast iron plates and frames, that is plates and frames composed of materials which do not become warped under the stresses of normal operating conditions.

However, it has been found in practice that the plates and frames are often made of wood. It has been found that the point of the releasing of the latch on a plate from a preceding frame changes by the warping of the wood. This results in that the frames are tilted too much before the latch is released so that the lower edge of the frame strikes the lower edge of the preceding plate. This occurs most often in the last quarter section of the plates in very long filter presses since the open space here between the empty frame and the packet of plates filled with filter cake has become smaller, and this disturbs the removal of the cake from the frame.

In this invention, it has been found that such disadvantage can be avoided by connecting the lower portion of each hollow frame to the lower portion of the preceding plate by means of a flexible connector such as a chain, band, rope or the like.

The means by which the objects of the invention are obtained are described more fully with reference to the accompanying schematic drawing showing a partial side view of the filter frames and plates supported on rods in a filter press.

The drawing substantially corresponds to FIG. 1 of said copending application. On bars or tracks 1, each filter frame 2 and filter plate 3 is movably supported by means of studs 4 and 5, respectively. The frames and plates are moved and tilted by coupling means 6 which are shown more fully in German Patent No. 1,138,739. The upper end of each plate 3 carries a latch 7 which engages a pin 8 on the upper end of the adjacent preceding frame 2. As frame 2 is moved to the left in the direction shown by the arrow, its upper end is held back so that the frame is tilted. This tilting continues until the pin 8 drops such a distance as to be released from latch 7. During the tilting, the filter cake falls out of the frame.

In the improvement of this invention, the lower end of the hollow frame 2 on each side edge is connected to the lower end of the preceding filter plate 3 by means of short chains, ropes or other flexible connectors 20. This causes the preceding plate 3 to pull and tilt the following frame 2. This causes the lower edge 22 of the frame crossbeam 24 to be lowered and thus causes the filter cake to be dumped from the frame. This ensures that the frame is sufficiently tilted during short open stretches in the press to dump the filter cake, whereas such effective tilting might not otherwise occur.

This invention substantially guarantees that even in long filter presses the frames are satisfactorily emptied of the filter cake.

Having now described the means by which the objects of the invention are obtained,

I claim:

1. In a plate-frame filter press comprising a series of alternately spaced pairs of plates and frames, rod means supporting said plates and frames, means for moving a frame away from a preceding plate of said pairs at a predetermined angle, and coupling means mounted on the upper portion of each pair of plates and frames for holding the upper portion of each pair of plates and frames rotatably together at said angle and for releasing the frame at the point where said angle is exceeded, the improvement further comprising flexible means connecting the bottom of each frame to the bottom of a plate in a preceding pair for pulling the bottom of the frame along with the bottom of the preceding plate.

2. In a press as in claim 1, said frame being pulled to a position inclined to the vertical.

References Cited

UNITED STATES PATENTS

| 699,052 | 4/1902 | Wilson | 210—227 |
| 3,232,435 | 2/1966 | Fismer | 210—230 |
| 3,289,844 | 12/1966 | Emele | 210—225 |

FOREIGN PATENTS

| 1,138,739 | 10/1962 | Germany. |
| 1,200,258 | 9/1965 | Germany. |
| 879,164 | 10/1961 | Great Britain. |

REUBEN FRIEDMAN, *Primary Examiner.*

C. DITLOW, *Assistant Examiner.*